United States Patent
Opos (10) Patent No.: US 10,820,205 B1
(45) Date of Patent: Oct. 27, 2020

(54) SYSTEMS AND METHODS FOR PERFORMING REPUTATION-BASED IDENTIFICATION OF APPLICATIONS ON UNMANAGED MOBILE DEVICES

(71) Applicant: Symantec Corporation, Mountain View, CA (US)

(72) Inventor: Josh Opos, Studio City, CA (US)

(73) Assignee: NortonLifeLock, Inc., Tempe, AZ (US)

( * ) Notice: Subject to any disclaimer, the term of this patent is extended or adjusted under 35 U.S.C. 154(b) by 0 days.

(21) Appl. No.: 16/287,165

(22) Filed: Feb. 27, 2019

(51) Int. Cl.
| | |
|---|---|
| *H04W 12/08* | (2009.01) |
| *H04W 12/00* | (2009.01) |
| *H04L 29/08* | (2006.01) |
| *G06N 20/00* | (2019.01) |
| *H04L 9/00* | (2006.01) |
| *G06F 21/00* | (2013.01) |

(52) U.S. Cl.
CPC ............ *H04W 12/08* (2013.01); *H04L 67/26* (2013.01); *H04W 12/0027* (2019.01); *G06F 21/00* (2013.01); *G06N 20/00* (2019.01); *H04L 9/00* (2013.01); *H04W 12/00505* (2019.01)

(58) Field of Classification Search
CPC ............... H04W 12/00; H04W 12/002; H04W 12/0027; H04W 12/005; H04W 12/00505; H04W 12/08; H04L 67/26; H04L 67/1507; H04L 9/00; H04L 29/06551; H04L 29/08375; G06F 21/00; G06N 20/20
See application file for complete search history.

(56) References Cited

U.S. PATENT DOCUMENTS

| | | | |
|---|---|---|---|
| 8,695,060 B2 * | 4/2014 | Wade | G06F 21/54 726/1 |
| 8,925,092 B1 * | 12/2014 | Johansson | H04L 63/1433 726/25 |

(Continued)

OTHER PUBLICATIONS

"Analyze live video at scale in real-time using Amazon Kinesis Video Streams and Amazon SageMaker", URL: https://aws.amazon.com/about-aws/whats-new/2018/11/analyze-live-video-at-scale-in-real-time-using-amazon-kinesis-video-streams-and-amazon-sagemaker/., Nov. 20, 2018, 2 pages.

(Continued)

*Primary Examiner* — Warner Wong
(74) *Attorney, Agent, or Firm* — FisherBroyles, LLP (57) ABSTRACT

The disclosed computer-implemented method for performing reputation-based identification of applications on unmanaged mobile devices may include (i) receiving screen content displayed on an unmanaged mobile device, (ii) analyzing, by a machine-learning algorithm, the screen content to identify a set of applications stored on the unmanaged mobile device, (iii) querying a reputation service for reputation data associated with each of the applications, the reputation data including a security classification describing potential threats against the unmanaged mobile device, (iv) associating the reputation data with each of the applications, and (v) generating a notification comprising a list of the applications and the associated reputation data for utilization by the unmanaged mobile device to perform one or more protective actions against the potential threats. Various other methods, systems, and computer-readable media are also disclosed.

18 Claims, 7 Drawing Sheets

(56) References Cited

U.S. PATENT DOCUMENTS

| | | | | |
|---|---|---|---|---|
| 9,201,591 | B1* | 12/2015 | Wardle | G06F 3/0488 |
| 2004/0230835 | A1* | 11/2004 | Goldfeder | G06F 21/51 |
| | | | | 726/23 |
| 2007/0203852 | A1* | 8/2007 | Cameron | G06Q 30/06 |
| | | | | 705/75 |
| 2009/0055647 | A1* | 2/2009 | Yu | H04L 63/0823 |
| | | | | 713/168 |
| 2011/0141276 | A1* | 6/2011 | Borghei | H04W 12/08 |
| | | | | 348/143 |
| 2013/0055401 | A1* | 2/2013 | Kim | G06F 21/52 |
| | | | | 726/25 |
| 2014/0074452 | A1* | 3/2014 | Carmi | G06F 8/10 |
| | | | | 703/22 |
| 2014/0253574 | A1* | 9/2014 | Brown | G06T 1/0007 |
| | | | | 345/545 |
| 2016/0359862 | A1* | 12/2016 | Riva | H04W 12/08 |
| 2017/0269976 | A1* | 9/2017 | Venkataraman | G06F 9/54 |
| 2018/0219909 | A1* | 8/2018 | Gorodissky | H04L 43/50 |
| 2019/0258822 | A1* | 8/2019 | Venkataraman | G06F 11/3438 |
| 2020/0045073 | A1* | 2/2020 | Ekambaram | H04L 43/04 |

OTHER PUBLICATIONS

Hissibini, Christian, How to Analyze Videos in Real-time Microsoft Cognitive Services, URL: https://histechup.com/how-to-analyze-videos-in-real-time-microsoft-cognitive-services/, Dec. 15, 2017, 14 pages.

* cited by examiner

SYSTEMS AND METHODS FOR PERFORMING REPUTATION-BASED IDENTIFICATION OF APPLICATIONS ON UNMANAGED MOBILE DEVICES

BACKGROUND

Security features associated with protecting enterprise and consumer computing devices from potentially harmful applications may often be enforced by installing third-party software incorporating mobile device management (MDM) features. For example, third-party MDM software running on mobile devices utilized in an enterprise environment may include features for managing application distribution and scanning applications against security whitelists and blacklists to protect against potential threats.

The security features provided by traditional MDM software however, are often limited to mobile devices having MDM profiles installed by an administrator on enterprise mobile devices or alternatively, consumer mobile computing devices utilized in an enterprise environment pursuant to bring your own device (BYOD) policies. Thus, these features are unavailable for mobile devices without MDM (e.g., unmanaged mobile devices) and programmatic alternatives are often prevented from being implemented by mobile device manufacturers through restrictions built into their operating systems.

SUMMARY

As will be described in greater detail below, the instant disclosure describes various systems and methods for performing reputation-based identification of applications on unmanaged mobile devices.

In one example, a computer-implemented method for performing reputation-based identification of applications on unmanaged mobile devices may include (i) receiving, by one or more computing devices, screen content displayed on an unmanaged mobile device, (ii) analyzing, by a machine-learning algorithm executing on the one or more computing devices, the screen content to identify a set of applications stored on the unmanaged mobile device, (iii) querying, by the one or more computing devices, a reputation service for reputation data associated with each of the applications, the reputation data including a security classification describing potential threats against the unmanaged mobile device, (iv) associating, by the one or more computing devices, the reputation data with each of the applications, and (v) generating, by the one or more computing devices, a notification comprising a list of the applications and the associated reputation data for utilization by the unmanaged mobile device to perform one or more protective actions against the potential threats.

In some embodiments, the unmanaged mobile device may be a client computing device excluding one or more mobile device management features. In some examples, receiving the screen content may include receiving a broadcast of the screen content from a device scan initiated by a client application executing on the unmanaged mobile device. In some embodiments, the screen content may include one or more application icons scanned from at least one page of a home display screen on the unmanaged mobile device. Additionally or alternatively, the screen content may include a list of applications loaded on the unmanaged mobile device scanned from a settings menu displayed on the unmanaged mobile device.

In some examples, analyzing the screen content may include (i) analyzing a media stream including the screen content and (ii) identifying the applications stored on the unmanaged mobile device from the screen content in the media stream. In some embodiments, the notification may be generated by creating a push message including the list of the applications and the associated reputation data for displaying on the unmanaged mobile device.

In some examples, the reputation data may include data describing a malware threat associated with one or more of the applications. Additionally or alternatively, the reputation data may include describing a device power resource threat associated with one or more of the applications. Additionally or alternatively, the reputation data may include data describing a safe application status associated with one or more of the applications.

In one embodiment, a system for performing reputation-based identification of applications on unmanaged mobile devices may include at least one physical processor and physical memory that includes a set of modules and computer-executable instructions that, when executed by the physical processor, cause the physical processor to (i) receive, by a receiving module, screen content displayed on an unmanaged mobile device, (ii) analyze, by an analysis module executing a machine learning algorithm, the screen content to identify a set of applications stored on the unmanaged mobile device, (iii) query, by a query module, a reputation service for reputation data associated with each of the applications, the reputation data including a security classification describing potential threats against the unmanaged mobile device, (iv) associate, by the query module, the reputation data with each of the applications, and (v) generate, by a security module, a notification comprising a list of the applications and the associated reputation data for utilization by the unmanaged mobile device to perform one or more protective actions against the potential threats.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive screen content displayed on an unmanaged mobile device, (ii) analyze, by a machine-learning algorithm executing on the computing device, the screen content to identify applications stored on the unmanaged mobile device, (iii) query a reputation service for reputation data associated with each of the applications, the reputation data including a security classification describing potential threats against the unmanaged mobile device, (iv) associate the reputation data with each of the applications, and (v) generate a notification comprising a list of the applications and the associated reputation data for utilization by the unmanaged mobile device to perform one or more protective actions against the potential threats.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for performing reputation-based identification of applications on unmanaged mobile devices. As will be described in greater detail below, the systems and methods described herein may utilize a machine-learning algorithm to identify applications stored on a mobile device from a received media stream, query a reputation service for each identified application, and send a notification to the mobile device with a list of the applications and their respective reputations for display to a user. By utilizing the machine-learning algorithm in this way, the system and methods described herein may notify users of unmanaged mobile devices of potential security threats that would otherwise be undetectable due to restrictions against the inspection of applications imposed by mobile device operating systems.

In addition, the systems and methods described herein may improve the security of unmanaged mobile computing devices by identifying potential threats such as malware and resource intensive applications. The systems and methods herein may further provide helpful instructions to facilitate the removal of potential threats and protect mobile computing devices from harm.

Figure 1:
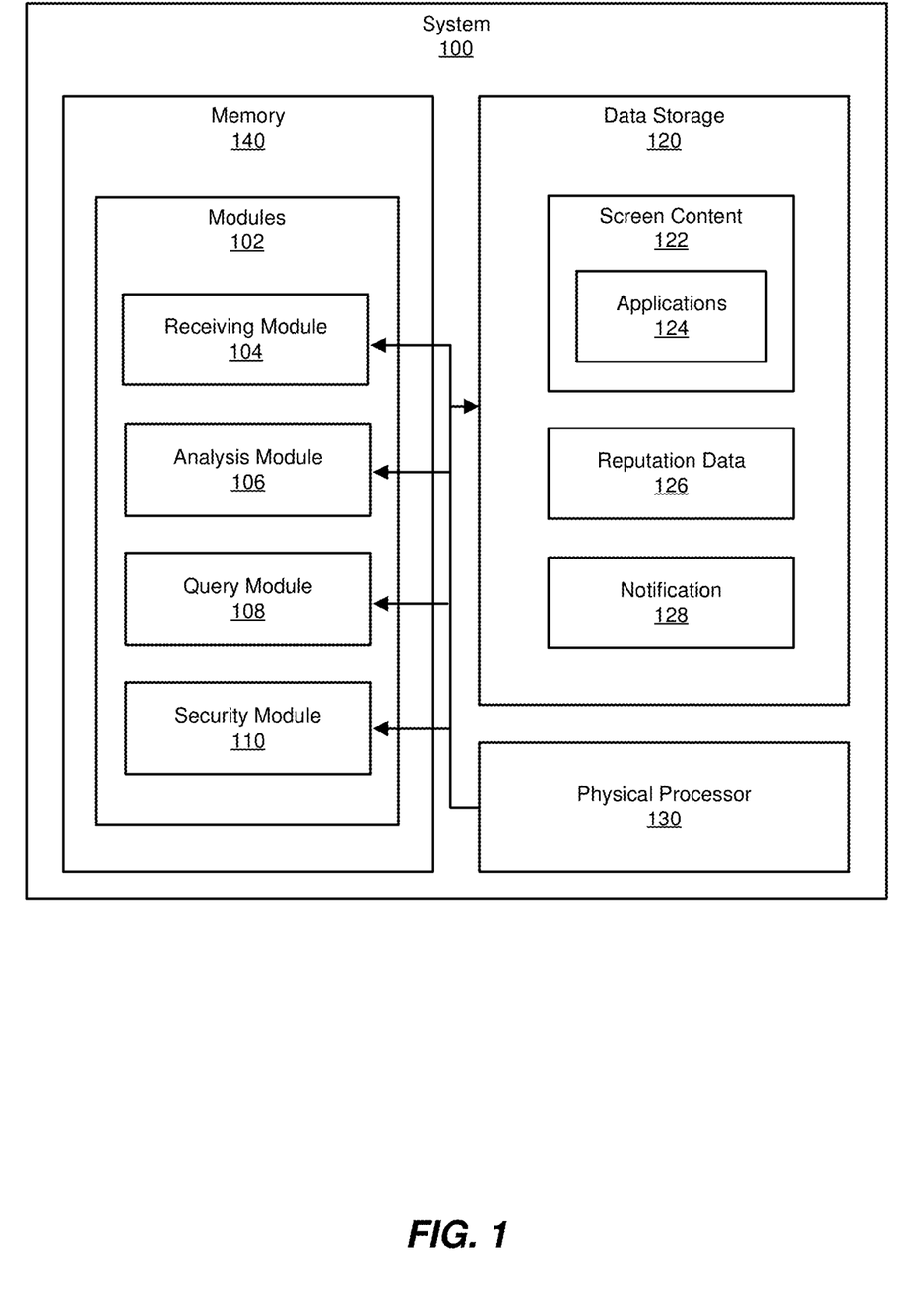
FIG. 1 is a block diagram of an example system for performing reputation-based identification of applications on unmanaged mobile devices.
Figure 2:
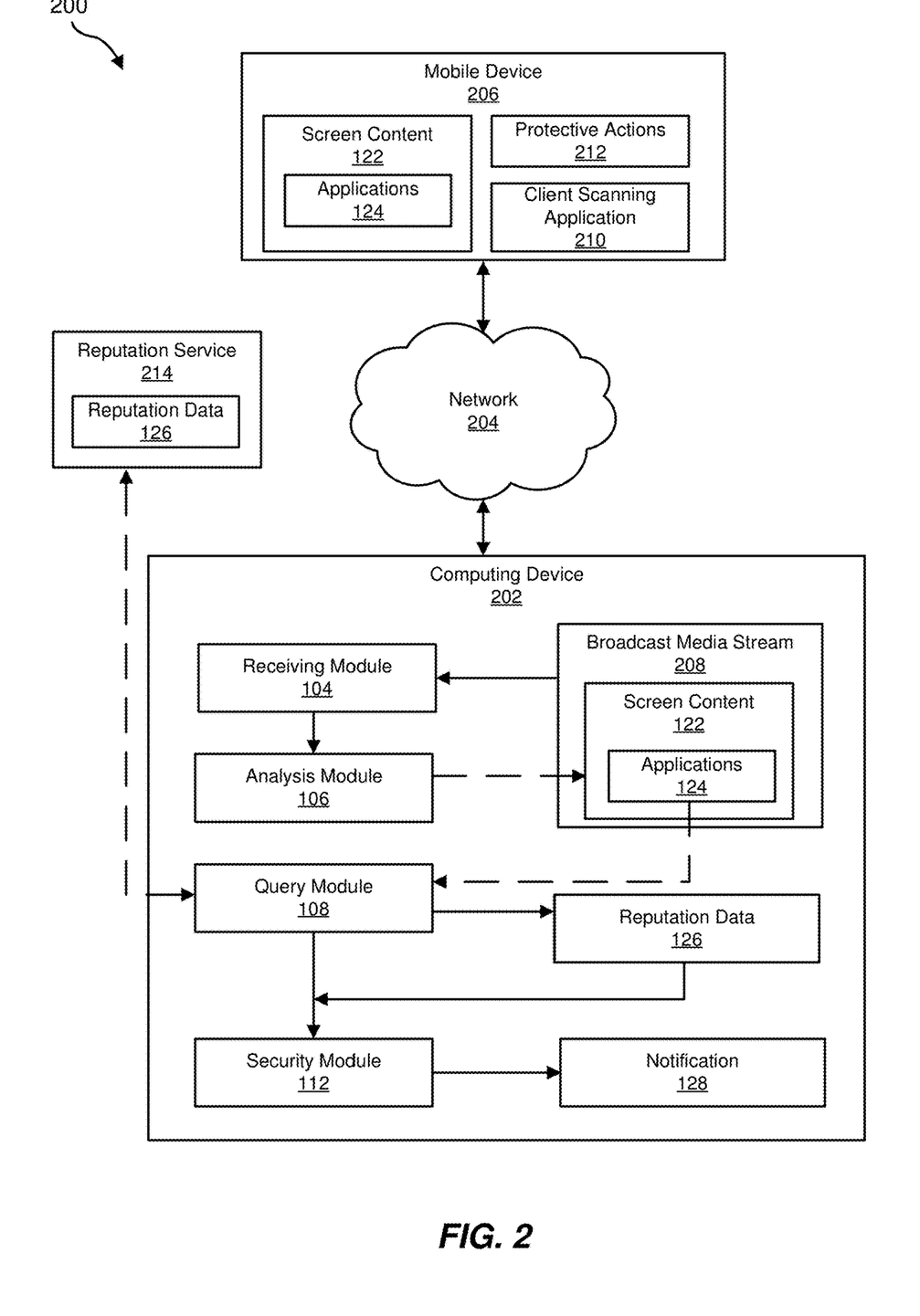
FIG. 2 is a block diagram of an additional example system for performing reputation-based identification of applications on unmanaged mobile devices.

The following will provide, with reference to FIGS. 1-2, detailed descriptions of example systems for performing reputation-based identification of applications on unmanaged mobile devices. Detailed descriptions of corresponding computer-implemented methods will also be provided in connection with FIG. 3. A detailed description of a communication chart for an example system for performing reputation-based identification of applications on unmanaged mobile devices will also be provided in connection with FIG. 4. A detailed description of example user interfaces generated by an example system for performing reputation-based identification of applications on unmanaged mobile devices will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for performing reputation-based identification of applications on unmanaged mobile devices. As illustrated in this figure, example system 100 may include one or more modules 102 for performing one or more tasks. For example, and as will be explained in greater detail below, example system 100 may include a receiving module 104 that receives screen content 122 displayed on an unmanaged mobile device. Example system 100 may additionally include an analysis module 106 that utilizes a machine-learning algorithm to analyze screen content 122 to identify a set of applications 124 stored on the unmanaged mobile device. Example system 100 may also include a query module 108 that queries a reputation service for reputation data 126 associated with each of applications 124 and that associates reputation data 126 with each of applications 124. Example system 100 may additionally include a security module 110 that generates a notification 128 including a list of applications 124 and associated reputation data 126 for utilization by the unmanaged mobile device to perform one or more protective actions against potential threats. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or mobile device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate performing reputation-based identification of applications on unmanaged mobile devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store screen content 122, applications 124, reputation data 126, and notification 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a mobile device 206 via a network 204. In one example, all or a portion of the functionality of modules 102 may be performed by computing device 202, mobile device 206, and/or any other suitable computing system. As will be described in greater detail below, one or more of modules 102 from FIG. 1 may, when executed by at least one processor of computing device 202 and/or mobile device 206, enable computing device 202 and/or mobile device 206 to perform reputation-based identification of applications on unmanaged mobile devices.

For example, receiving module 104 may receive a broadcast media stream 208 (which may be initiated by client scanning application 210 executing on mobile device 206) including screen content 122 and applications 124. Next, analysis module 106, utilizing a machine-learning algorithm, may analyze screen content 122 in broadcast media stream 208 to identify applications 124 for query module 108 to query for associated reputation data 126. Then, query module 108 may query a reputation service 214 for reputation data 126 associated with each of applications 124. Query module 108 may then further associate reputation data 126 received from reputation service 214 with each of applications 124. Next, security module 112 may generate notification 128 including a list of applications 124 and associated reputation data 126 for utilization by mobile device 206 to perform one or more protective actions 212 against potential threats identified in reputation data 126.

Computing device 202 generally represents any type or form of computing device capable of reading computer-executable instructions. In some examples, computing device 202 may be one or servers providing media server, reputation, and/or notification service functions for mobile device 206 utilizing network 204. Additional examples of computing device 202 include, without limitation, application servers, web servers, storage servers, and/or database servers configured to run certain software applications and/or provide various security, web, storage, and/or database services. Although illustrated as a single entity in FIG. 2, computing device 202 may include and/or represent a plurality of servers that work and/or operate in conjunction with one another.

Mobile device 206 generally represents any type or form of computing device capable of reading computer-executable instructions. In some embodiments, mobile device 206 may represent an endpoint device for installing and executing various applications for consumer use over a cloud computing network. Additional examples of mobile device 206 include, without limitation, laptops, tablets, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and mobile device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
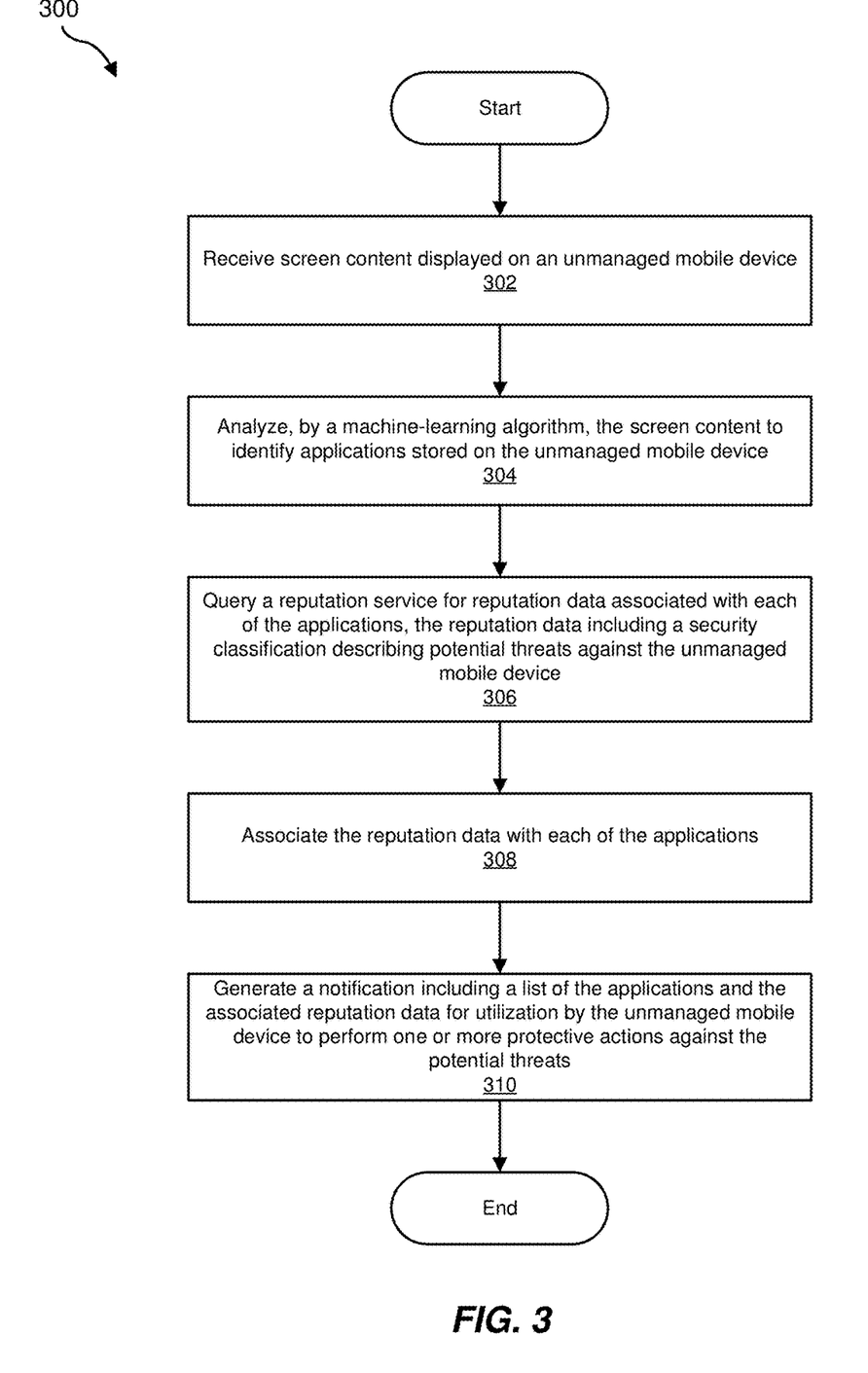
FIG. 3 is a flow diagram of an example method for performing reputation-based identification of applications on unmanaged mobile devices.

FIG. 3 is a flow diagram of an example computer-implemented method 300 for performing reputation-based identification of applications on unmanaged mobile devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive screen content displayed on an unmanaged mobile device. For example, receiving module 104 may, as part of computing device 202 in FIG. 2, receive screen content 122 displayed on mobile device 206. As described herein, mobile device 206 (hereinafter referred to as "unmanaged mobile device 206") may be any mobile computing device without mobile device management (MDM) features, such as an MDM profile, installed thereon. In some embodiments, screen content 122 may include one or more application icons associated with applications 124 scanned (by client scanning application 210) from at least one page of a home display screen on unmanaged mobile device 206. Additionally or alternatively, screen content 122 may include a list of applications 124 loaded on mobile device and scanned from a settings menu displayed on unmanaged mobile device 206.

The term "mobile device management (MDM)," as used herein, generally refers to the deployment of device applications, configurations, policies, and/or certificates in combination with a backend infrastructure for the purpose of simplifying and enhancing the management of end user devices used in enterprise environments. MDM features may include data segregation, data security, and device management features including controlling the distribution, management, and upgrading of employee devices. Examples of MDM devices include, without limitation, special purpose mobile computing devices programmed for use in an enterprise setting or consumer mobile computing devices for use in an enterprise setting (e.g., pursuant to bring your own device (BYOD) policies) having MDM software installed thereon.

Receiving module 104 may receive screen content 122 in a variety of ways. In some embodiments, receiving module 104 may receive a broadcast of screen content 122 from a device scan initiated by client scanning application 210 executing on unmanaged mobile device 206. For example, client scanning application 210 may be configured to scan application icons and application names displayed on a home screen (or alternatively in a settings menu) of unmanaged mobile device 206, convert the scan to broadcast media stream 208, and then send broadcast media stream 208 to receiving module 104.

At step 304, one or more of the systems described herein may utilize a machine-learning algorithm to analyze the screen content 122 received at step 302 for identifying a set of applications stored on the unmanaged mobile device. For example, analysis module 106 may, as part of computing device 202 in FIG. 2, utilize a machine-learning algorithm to analyze screen content 122 to identify applications 124 stored on unmanaged mobile device 206. In some examples, the machine-learning algorithm may be a machine-learning model for performing the analysis of screen content 122.

The term "machine-learning," as used herein, generally refers to utilizing statistical techniques to provide computer systems the ability to "learn" (e.g., progressively improve performance on a specific task) from data, without being explicitly programmed. In some examples, machine-learning may be performed by models utilizing ensemble learning methods for identification, classification, regression, and other tasks for generating one or more predictive outputs (e.g., classifiers) based on provided input data. Example machine-learning models may include, without limitation, support vector machine models, logistic regression models, random forest models, and deep learning (e.g., deep neural network (DNN)) models.

Analysis module 106 may analyze receive screen content 122 in a variety of ways. In some examples, analysis module 106 may analyze broadcast media stream 208 including screen content 122 and identify applications 124 from screen content 122. In some embodiments, the machine-learning algorithm utilized by analysis module 106 may employ deep learning techniques for training a model to find objects in broadcast media stream 208 corresponding to application icons and/or application names associated with applications 124.

At step 306, one or more of the systems described herein may query a reputation service for reputation data associated with each of the applications identified at step 304, the reputation data including a security classification describing potential threats against the unmanaged mobile device. For example, query module 108 may, as part of computing device 202 in FIG. 2, query reputation service 214 for reputation data 126 associated with each of applications 124. Reputation data 126 may include one or more security classifications describing potential threats against unmanaged mobile device 206.

The term "reputation service," as used herein, generally refers to a security mechanism that classifies files as safe or unsafe based on its inherently garnered reputation, thus making it possible to identify and predict file safety, based on its overall use and reputation over a wide community of users. In some examples, a reputation service may be utilized within security software for executable files, batch files and other file formats that are subject to carrying unsafe code. The reputation service may collect and track data (e.g., "reputation data") describing various attributes of a file, such as age, source, signature, and overall usage statistics across thousands of users consuming that file.

Query module 108 may query reputation service 214 in a variety of ways. In some examples, query module 108 may send a list of names corresponding to applications 124 to reputation service 214 and receive corresponding reputation data 126 from reputation service 214 in response. In some examples, the security classifications in reputation data 126 may include data describing a malware threat associated with one or more of applications 124. Additionally or alternatively, the security classifications in reputation data 126 may include data describing a describing a device power resource threat (e.g., an application that causes a significant battery drain on mobile computing devices) associated with one or more of applications 124. Additionally or alternatively, the security classifications in reputation data 126 may include data describing a safe application status associated with one or more of applications 124. In some examples, reputation service 214 may be a local service (e.g., a database) stored on computing device 202. In other examples, reputation service 214 may be a remote service (e.g., a cloud-based service) in communication with computing device 202 over network 204.

At step 308, one or more of the systems described herein may associate the received from the query of the reputation service performed at step 306 with each of the applications. For example, query module 108, following the receipt of reputation data 126, may associate reputation data 126 with each of applications 124 for which a reputation was received.

Query module 108 may associate reputation data 126 with applications 124 in a variety of ways. In some examples, query module 108 may generate a list of the applications names corresponding to applications 124 and correspondingly list reputation data 126 next to each application 124 in the list for which a reputation was received.

At step 310, one or more of the systems described herein may generate a notification including a list of the applications and the associated reputation data for utilization by the unmanaged mobile device to perform one or more protective actions against the potential threats. For example, security module 110 may generate notification 128 including a list of applications 124 and associated reputation data 126 for utilization by unmanaged mobile device 206 to perform protective actions against potential threats. In some examples, protective actions may include setting a power saving mode on unmanaged mobile device 206 (e.g., for applications 124 having a reputation for causing a battery drain during use) and/or running an anti-malware (e.g., antivirus application) to remove applications 124 having a reputation for being malicious.

Security module 110 may generate notification 128 in a variety of ways. In some examples, security module 110 may create a push message including the list of applications 124 and associated reputation data 126 for displaying to a user on unmanaged mobile device 206. After the push message is created, security module 110 may then transmit the message to unmanaged mobile device 206 over network 204.

Figure 4:
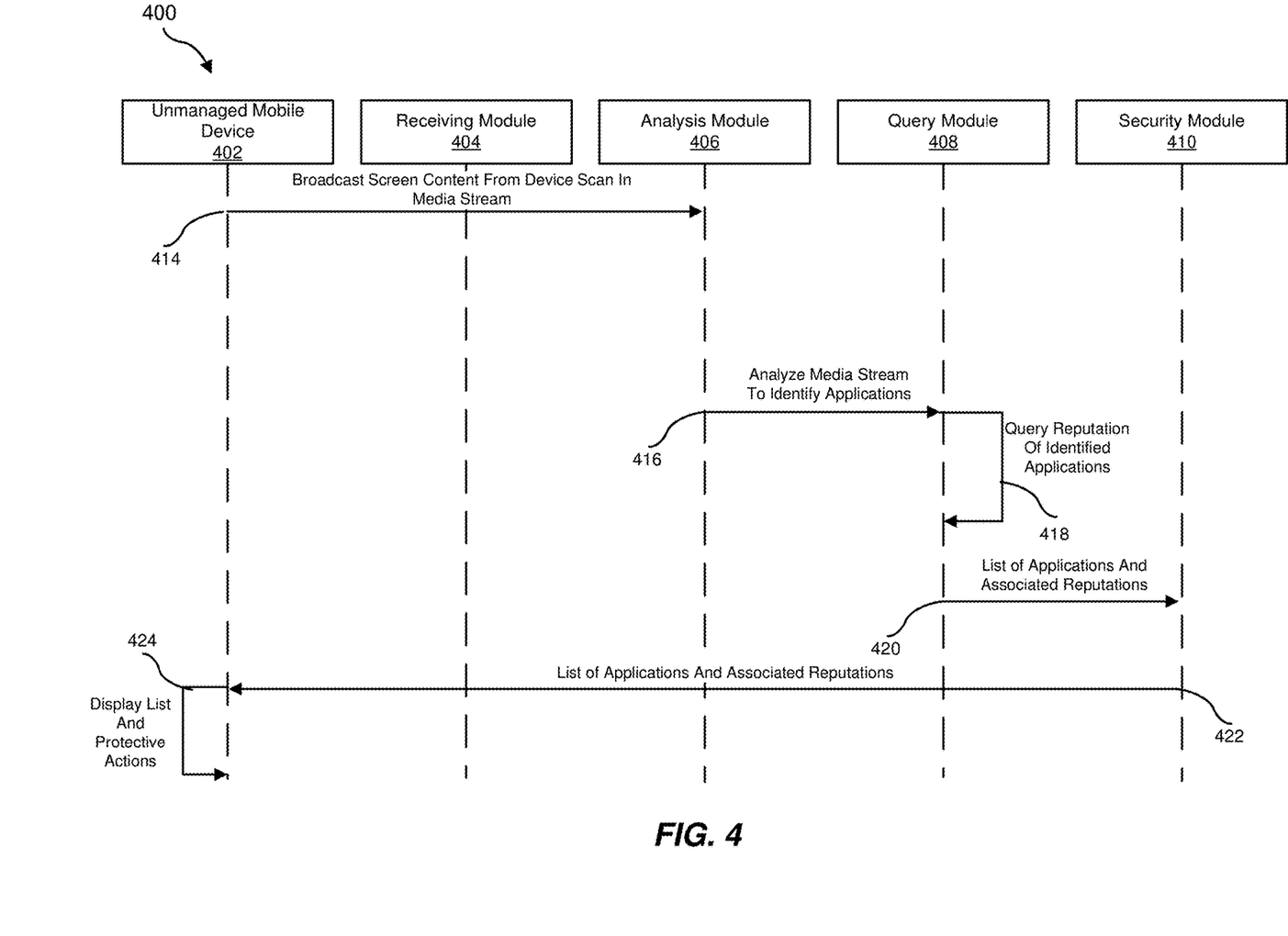
FIG. 4 is a communication chart for an example system performing the example method of FIG. 3.

FIG. 4 is a communication chart 400 for an example system performing the example method of FIG. 3. In communication chart 400 unmanaged mobile device 402 may send a broadcast message 414 of screen content from a scan of unmanaged mobile device 402 as a media stream to receiving module 404. For example, the screen content may represent a scan of application icons (and corresponding names) displayed on a home screen and/or a settings menu on unmanaged mobile device 402. Upon the media stream including the screen content being received at receiving module 404, receiving module 404 may then forward the media stream to analysis module 406.

Upon receiving the media stream including the screen content from receiving module 404, analysis module 406 may analyze the media stream to identify the applications scanned on unmanaged mobile device 402 and then forward a list of the applications in a message 416 to query module 408 to obtain reputation data for each of the applications. Query module 408, which may include a reputation service, may then generate a message 418 for querying reputations of each of the applications identified by analysis module 406 and receive the aforementioned reputations.

Upon receiving the reputations for the applications, query module 408 may then send a list of the applications and associated reputations in a message 420 to security module 410. Security module 410 may then generate a message 422 (e.g., a push message) including the list of applications and associated reputations and send the message 422 to unmanaged mobile device 402. Upon receiving the message 422 from security module 410, unmanaged mobile device 402 may then display the list of the applications, their associated reputations, and protective actions for addressing any identified potential threats in a message 424.

Figure 5:
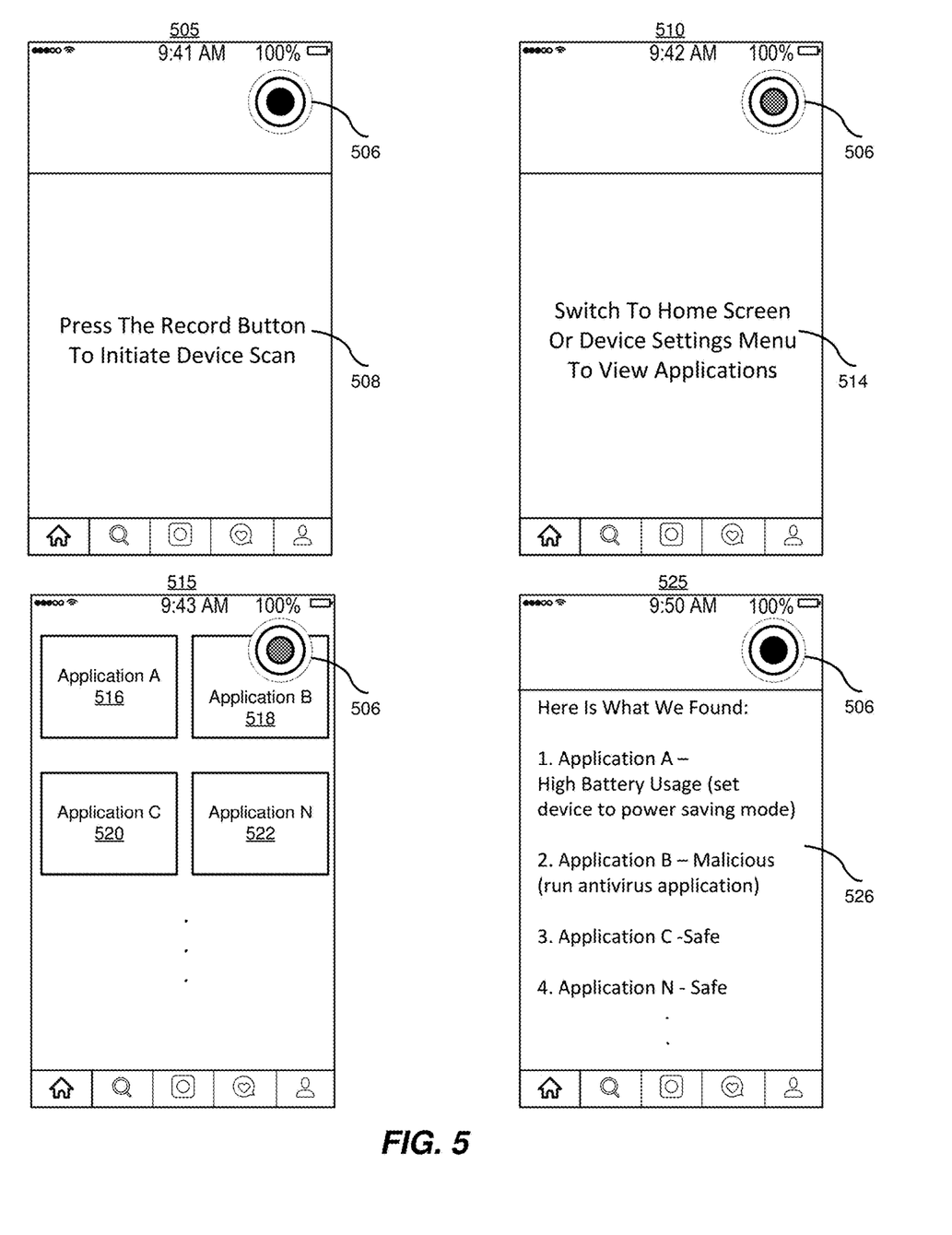
FIG. 5 is a block diagram of example user interfaces generated by an example system for performing reputation-based identification of applications on unmanaged mobile devices.

FIG. 5 is a block diagram of example user interfaces generated by an example system for performing reputation-based identification of applications on unmanaged mobile devices. The example user interfaces of FIG. 5 may include user interfaces 505, 510, 515, and 525. User interface 505 shows a record button 506 for initiating a scan of an unmanaged mobile device for applications stored thereon. User interface 505 also shows instructions for initiating the device scan (e.g., by pressing record button 506) on a touch sensitive display of the unmanaged mobile device.

User interface 510 shows record button 506 having been activated by a user and additional instructions 514 for performing the device scan of applications stored on the unmanaged mobile device. For example, the instructions may include directions to switch to one or more home screens displaying icons and names identifying each of the applications stored on the unmanaged mobile device. Additionally or alternatively, the instructions may include directions to access a settings menu showing a list of applications installed on the unmanaged mobile device. In some embodiments, both instructions may be displayed to ensure that all of the applications stored on a mobile device are scanned. For example, if a user has moved multiple applications icons to a folder on a home screen of the unmanaged mobile device such that one or more application icons are hidden when viewing the home display screen, scanning the listing of applications displayed in the settings menu will ensure that the hidden applications are also scanned.

User interface 515 shows record button 506 having been activated by a user and icons and descriptions for applications displayed on the unmanaged mobile device being scanned. For example, the scanned applications may include Application A 516, Application B 518, Application C 520, Application N 522, etc. Following the completion of the scan, a client application (e.g., client scanning application 210 of FIG. 2) may convert the captured screens to a media stream and transmit the media stream to a media/analysis server (e.g., computing device 202 of FIG. 2) for identifying the scanned applications in the media stream, retrieving reputations for each of the applications, associating the reputations with each of the applications, and generating a notification as described above in the example method of FIG. 3.

User interface 525 shows a listing of applications and reputations in a notification 526 received by the unmanaged mobile device. In some examples, notification 522 may include helpful instructions for addressing potential security threats based on the reputations associated with the applications. For example, notification 526 shows that Application A 516 has a reputation for high battery usage and thus the user may be instructed to set a power saving mode on the unmanaged mobile device when this application is in use. As another example, notification 526 shows that Application B 518 has a reputation for being malicious and thus the user may be instructed to run an antivirus application on the unmanaged mobile device to prevent this application from causing harm. As yet another example, notification 526 shows that Application C 520 and Application N 522 have a reputation of being safe thus reassuring a user of the unmanaged mobile device that these applications do not represent a threat when used.

As explained in connection with method 300 above, the systems and methods described herein provide for performing reputation-based identification of applications on unmanaged mobile devices. By leveraging machine-learning algorithms and broadcast capabilities of mobile device operating systems, the systems described herein may analyze applications on unmanaged mobile devices without violating policy restrictions imposed by device manufacturers. The broadcast capabilities may include a mobile device application configured to initiate a "live" screen broadcast to a remote server in real time. This mobile device application may further be configured to transmit the display screen to an inspection service via a broadcast stream. The inspection service may be configured to utilize machine-learning/computer vision algorithms to identify all of the applications displayed on the mobile device and captured in the broadcast stream, query a reputation service to identify a reputation for each of the applications, and send a push notification back to the transmitting device (e.g., the unmanaged mobile device) with a list of the applications and their associated reputations. The machine-learning algorithms may utilize deep learning techniques for training a model to find objects in broadcast video streams such as application icons and/or application names displayed on the unmanaged mobile device. Once the push notification has been received by an unmanaged mobile device, the broadcast application may be configured to display the notification to a user along with helpful instructions for addressing any potential threats based on the identified reputations.

Figure 6:
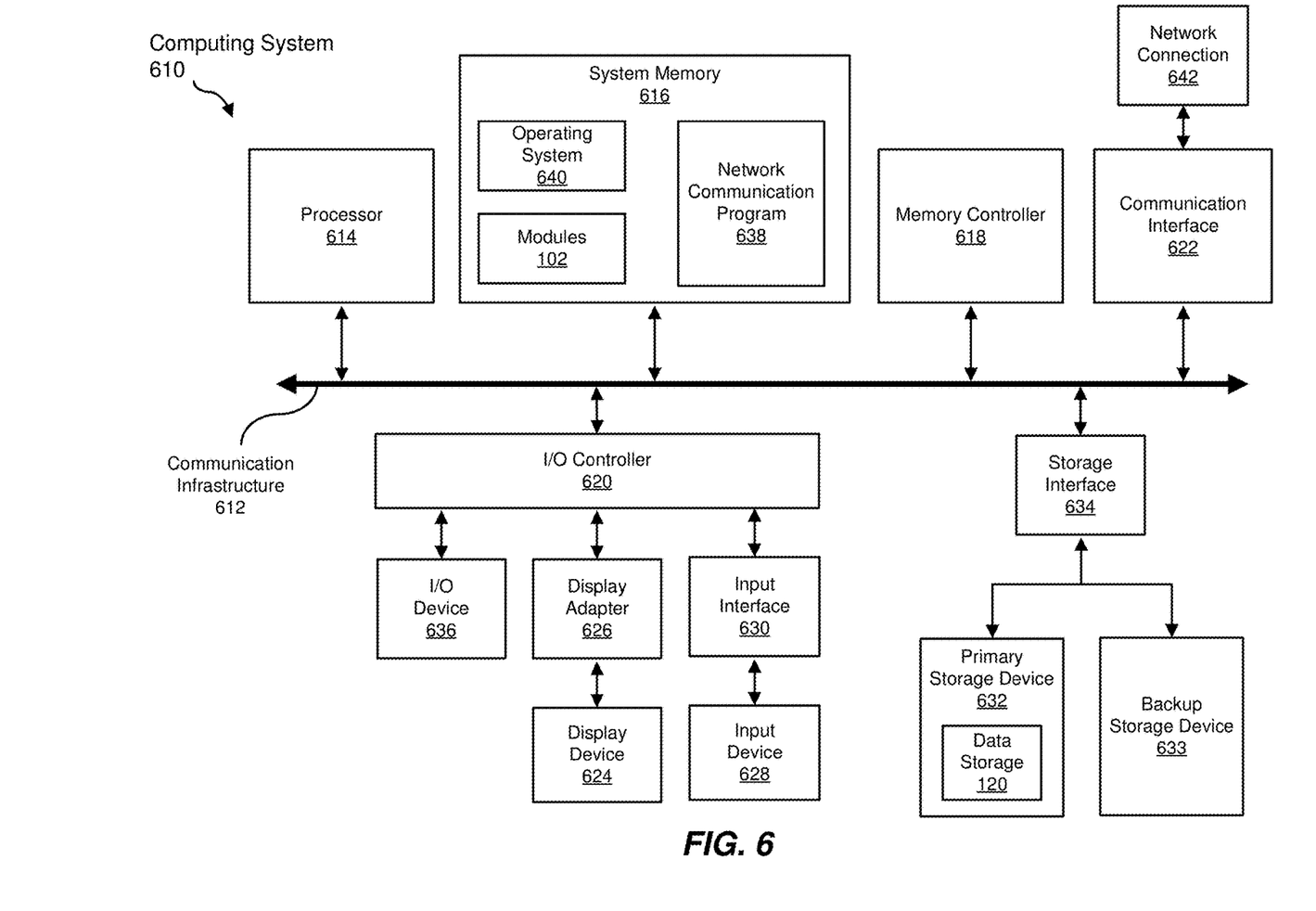
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
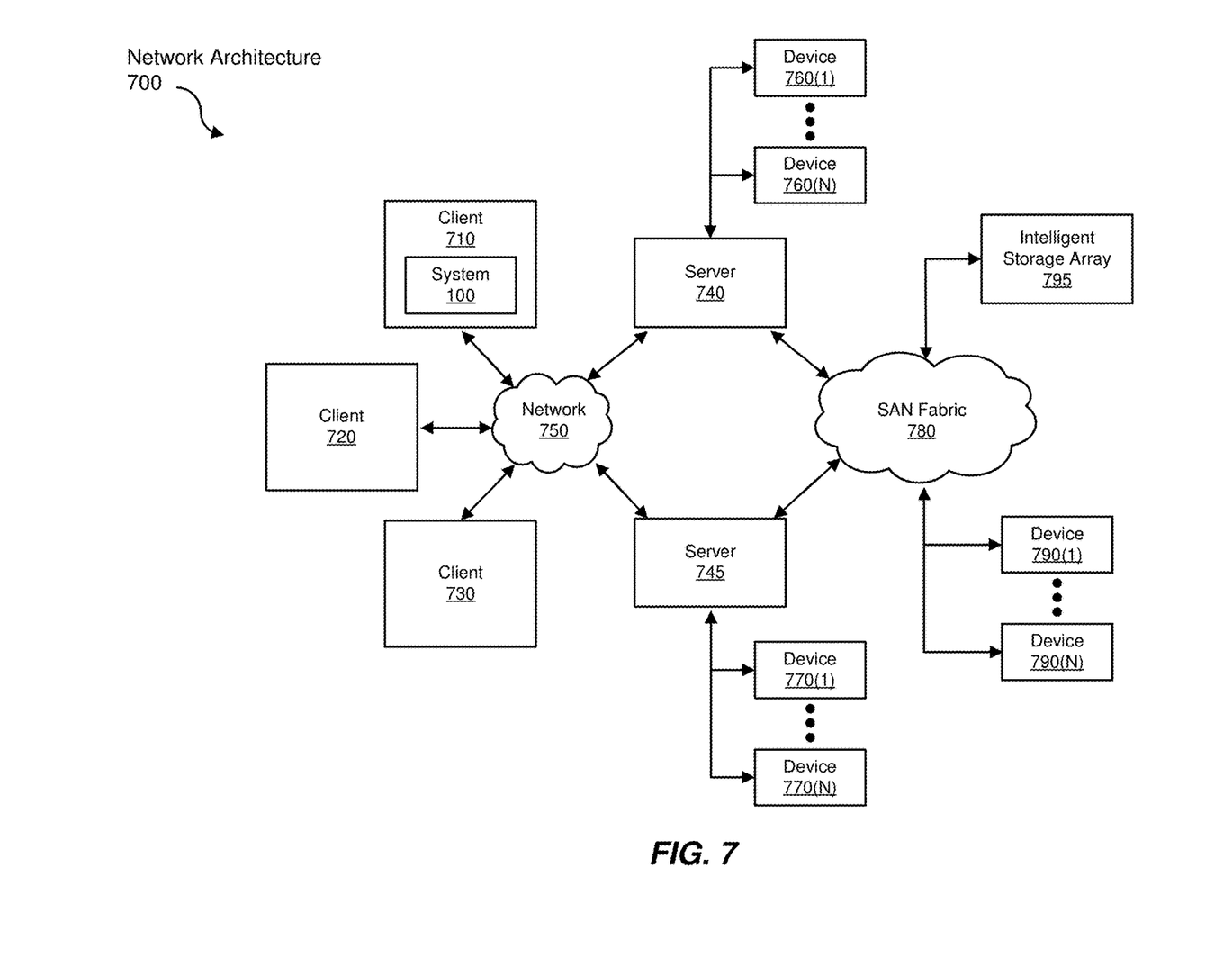
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for performing reputation-based identification of applications on unmanaged mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing reputation-based identification of applications on unmanaged mobile devices, at least a portion of the method being performed by a computing device comprising at least one processor, the method comprising:
   receiving, by the one or more computing devices, screen content displayed on an unmanaged mobile device, wherein receiving the screen content comprises receiving a broadcast of the screen content from a device scan initiated by a client application executing on the unmanaged mobile device;
   analyzing, by a machine-learning algorithm executing on the one or more computing devices, the screen content to identify a set of applications stored on the unmanaged mobile device;
   querying, by the one or more computing devices, a reputation service for reputation data associated with each of the applications, the reputation data including a security classification describing potential threats against the unmanaged mobile device;
   associating, by the one or more computing devices, the reputation data with each of the applications; and
   generating, by the one or more computing devices, a notification comprising a list of the applications and the associated reputation data for utilization by the unmanaged mobile device to perform one or more protective actions against the potential threats.

2. The computer-implemented method of claim 1, wherein analyzing the screen content comprises:
   analyzing a media stream comprising the screen content; and
   identify the applications stored on the unmanaged mobile device from the screen content in the media stream.

3. The computer-implemented method of claim 1, wherein generating the notification comprises creating a push message comprising the list of the applications and the associated reputation data for displaying on the unmanaged mobile device.

4. The computer-implemented method of claim 1, wherein the reputation data comprises data describing a malware threat associated with one or more of the applications.

5. The computer-implemented method of claim 1, wherein the reputation data comprises data describing a device power resource threat associated with one or more of the applications.

6. The computer-implemented method of claim 1, wherein the reputation data comprises data describing a safe application status associated with one or more of the applications.

7. The computer-implemented method of claim 1, wherein the screen content comprises one or more application icons scanned from at least one page of a home display screen on the unmanaged mobile device.

8. The computer-implemented method of claim 1, wherein the screen content comprises a list of applications loaded on the unmanaged mobile device scanned from a settings menu displayed on the unmanaged mobile device.

9. The computer-implemented method of claim 1, wherein the unmanaged mobile device comprises a client computing device excluding one or more mobile device management features.

10. A system for performing reputation-based identification of applications on unmanaged mobile devices, the system comprising:
- at least one physical processor;
- physical memory comprising a plurality of modules and computer-executable instructions that, when executed by the physical processor, cause the physical processor to:
  - receive, by a receiving module, screen content displayed on an unmanaged mobile device, wherein the receiving module receives the screen content by receiving a broadcast of the screen content from a device scan initiated by a client application executing on the unmanaged mobile device;
  - analyze, by an analysis module executing a machine learning algorithm, the screen content to identify a set of applications stored on the unmanaged mobile device;
  - query, by a query module, a reputation service for reputation data associated with each of the applications, the reputation data including a security classification describing potential threats against the unmanaged mobile device;
  - associate, by the query module, the reputation data with each of the applications; and
  - generate, by a security module, a notification comprising a list of the applications and the associated reputation data for utilization by the unmanaged mobile device to perform one or more protective actions against the potential threats.

11. The system of claim 10, wherein the analysis module analyzes the screen content by:
- analyzing a media stream comprising the screen content; and
- identify the applications stored on the unmanaged mobile device from the screen content in the media stream.

12. The system of claim 10, wherein the security module generates the notification by creating a push message comprising the list of the applications and the associated reputation data for displaying on the unmanaged mobile device.

13. The system of claim 10, wherein the reputation data comprises data describing a malware threat associated with one or more of the applications.

14. The system of claim 10, wherein the reputation data comprises data describing a device power resource threat associated with one or more of the applications.

15. The system of claim 10, wherein the reputation data comprises data describing a safe application status associated with one or more of the applications.

16. The system of claim 10, wherein the screen content comprises one or more application icons scanned from at least one page of a home display screen on the unmanaged mobile device.

17. The system of claim 10, wherein the screen content comprises a list of applications loaded on the unmanaged mobile device scanned from a settings menu displayed on the unmanaged mobile device.

18. A non-transitory computer-readable medium comprising one or more computer-executable instructions that, when executed by at least one processor of a computing device, cause the computing device to:
- receive screen content displayed on an unmanaged mobile device, wherein the screen content is received by receiving a broadcast of the screen content from a device scan initiated by a client application executing on the unmanaged mobile device;
- analyze, by a machine-learning algorithm executing on the computing device, the screen content to identify applications stored on the unmanaged mobile device;
- query a reputation service for reputation data associated with each of the applications, the reputation data including a security classification describing potential threats against the unmanaged mobile device;
- associate the reputation data with each of the applications; and
- generate a notification comprising a list of the applications and the associated reputation data for utilization by the unmanaged mobile device to perform one or more protective actions against the potential threats.

* * * * *